(12) United States Patent
Kitashou (10) Patent No.: US 9,131,182 B2
(45) Date of Patent: Sep. 8, 2015

(54) IMAGE PROCESSING APPARATUS, METHOD AND STORAGE MEDIUM

(71) Applicant: CANON KABUSHIKI KAISHA, Tokyo (JP)

(72) Inventor: Tetsurou Kitashou, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/231,877

(22) Filed: Apr. 1, 2014

(65) Prior Publication Data
US 2014/0333972 A1 Nov. 13, 2014

(30) Foreign Application Priority Data
May 8, 2013 (JP) ................................. 2013-098895

(51) Int. Cl.
*H04N 1/405* (2006.01)
*H04N 1/40* (2006.01)
*H04N 1/387* (2006.01)
*H04N 1/409* (2006.01)

(52) U.S. Cl.
CPC ........... *H04N 1/40062* (2013.01); *H04N 1/387* (2013.01); *H04N 1/4092* (2013.01)

(58) Field of Classification Search
CPC . G06T 5/002; G06T 5/20; G06T 2207/20012; G06T 2207/30004; G06T 1/00; G06T 5/003; H04N 5/208; H04N 7/0117; H04N 19/00066; H04N 1/40068

USPC ................ 358/3.24–3.27, 2.1, 453, 538, 462; 382/162, 260–269, 275
See application file for complete search history.

(56) References Cited

U.S. PATENT DOCUMENTS

| | | | |
|---|---|---|---|
| H2003 H * | 11/2001 | Minner | 382/254 |
| 7,039,236 B2 * | 5/2006 | Hashimoto et al. | 382/218 |
| 7,676,113 B2 * | 3/2010 | Damera-Venkata | 382/276 |
| 7,783,083 B2 * | 8/2010 | Sung et al. | 382/118 |
| 8,731,282 B1 * | 5/2014 | Schink | 382/162 |
| 2010/0150413 A1 * | 6/2010 | Futamura | 382/128 |
| 2010/0214620 A1 * | 8/2010 | Ishiguro | 358/3.28 |

FOREIGN PATENT DOCUMENTS

| JP | 1-134577 A | 5/1989 |
|---|---|---|
| JP | 3143209 B | 3/2001 |
| JP | 2012-060517 A | 3/2012 |

* cited by examiner

*Primary Examiner* — Thomas D Lee
*Assistant Examiner* — Stephen M Brinich
(74) *Attorney, Agent, or Firm* — Carter, DeLuca, Farrell & Schmidt, LLP

(57) ABSTRACT

An image processing apparatus discriminates between a first region, which is a consecutive region existing on a region exceeding a predetermined area in an input image, and a second region, which is other than the first region, performs smoothing processing of differing strengths on the first region and the second region, and performs image transformation processing on the image on which smoothing processing was performed.

15 Claims, 8 Drawing Sheets

FIG. 3

INPUT IMAGE 300

REGION INFORMATION 301

MACRO REGION (BLACK COLOR PORTION)
MICRO REGION (WHITE COLOR PORTION)

IMAGE PROCESSING APPARATUS, METHOD AND STORAGE MEDIUM

BACKGROUND OF THE INVENTION

1. Field of the Invention

The present invention relates to an image processing apparatus for solving a problem of clarity deteriorating when moire is reduced in image transformation processing.

2. Description of the Related Art

It is known that in image processing apparatuses, image transformation processing is performed as necessary. For example, in an image processing apparatus in which a projector product is mounted, image transformation processing called keystone (trapezoid) correction processing is performed. To explain specifically, when output light of the projector is projected onto a screen, for an effective region projected onto the screen a trapezoid shaped distortion occurs due to an installation inclined angle of the projector or an optical lens shift. Because, in a state in which there is a trapezoid shaped distortion in the effective region projected on the screen, it is difficult for a user to see, processing is performed to perform an image transformation so that the effective region projected onto the screen becomes a rectangular shape by performing an image transformation of the effective region for an inverted trapezoid shape. This image transformation processing is generally known as keystone (trapezoid) correction processing.

In order to perform image transformation processing with an object of keystone (trapezoid) correction processing, or the like, after storing, into a frame memory, an input image, each coordinate of an output image is generated by interpolating from pixels in a vicinity of the input image coordinates corresponding to the coordinates of the output image. A method such as, for example, a bi-cubic interpolating method, or the like is generally known as this interpolation method.

Note, there are cases in which image degradation called moire (interference fringes) occurs when image transformation processing is performed. Moire is an interference fringe that occurs due to a difference between a pixel pitch of the output image, and a pitch of coordinates on the input image corresponding to the pixels of the output image. The image degradation due to moire is caused by high-frequency components of the source image, and a method for removing high-frequency components by performing a smoothing process before the image transformation processing in order to ameliorate this is known (Japanese Patent Laid-Open No. 1-134577).

However, when the moire reduction processing (smoothing processing) of Japanese Patent Laid-Open No. 1-134577 is applied, though the moire is reduced, there is an adverse effect in that edges are smoothed and clarity deteriorates. Specifically, there are many cases in which it is desirable that regions such as characters in an image be clear, but as a result of the smoothing processing edges are dulled, and an output image in which the characters are unclear is generated. In response to this, in order to improve Japanese Patent Laid-Open No. 1-134577, a unit for searching for edge regions is used, and by applying weaker smoothing processing to edge regions than to non-edge regions, edge regions of characters or the like becoming unclear is prevented in a technique of Japanese Patent No. 3143209.

The method of Japanese Patent Laid-Open No. 1-134577 is a method for reducing moire by removing high-frequency components by performing smoothing processing before the image transformation processing. However, as previously explained, though the moire is reduced, there is an adverse effect in that edges are smoothed and clarity deteriorates with this method. Explanation will be given for this problem using FIGS. 2A-2D. FIGS. 2A-2D are views for explaining a moire reduction effect due to smoothing processing. Note, in order to simplify the explanation with these views, an image that is periodic in a one-dimensional direction is used as the input image. Explanation will be given for the relationship of the drawings of FIGS. 2A-2D below.

Figure 2A:
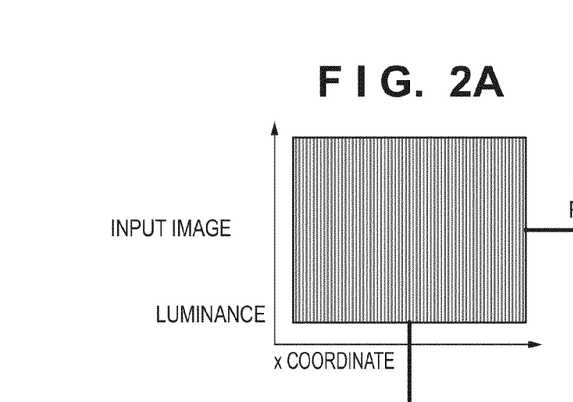
FIGS. 2A-2D are views for explaining a moire reduction effect due to smoothing processing.
Figures 2B, 2D:
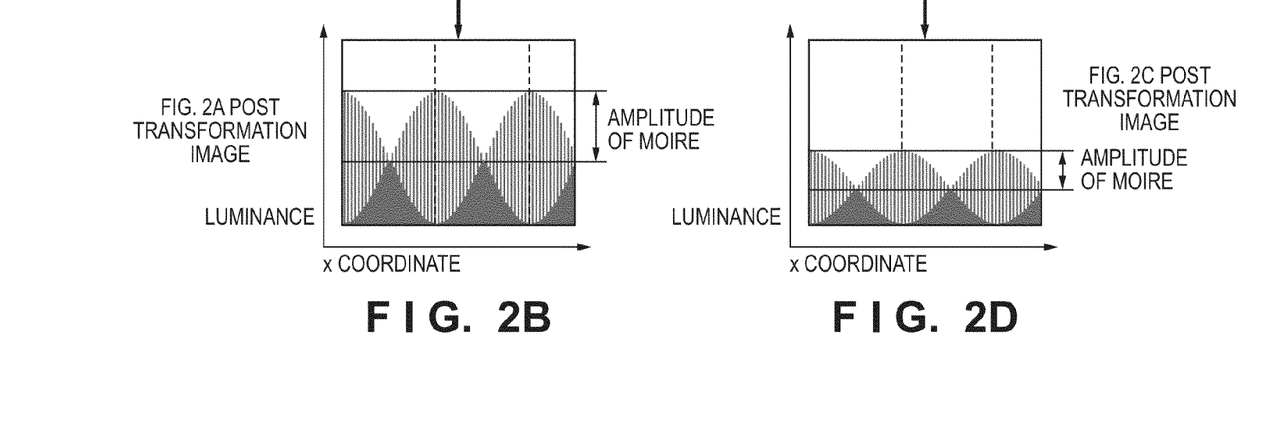
Figure 2C:
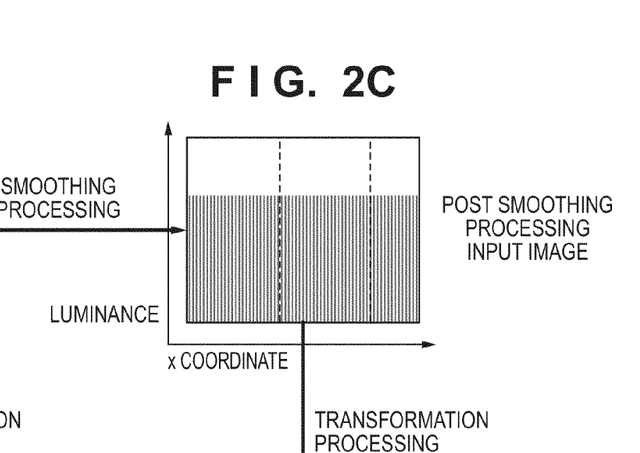

Firstly, FIG. 2A is an input image having a first period of two values (white/black) in a horizontal direction, and for FIGS. 2B-2D various processing (transformation processing, or smoothing processing) has been performed as shown graphically here. FIG. 2B is an image resulting from transformation processing being applied to the input image of FIG. 2A, and a second period not in FIG. 2A appears. The transformation processing is an example of one-dimensional direction enlargement processing, and due to interference of the period of the input image and the magnification factor here, the second period appears. So, periodic moire due to the amplitude of this second period is visibly recognizable. On the other hand, FIG. 2C is an image resulting from smoothing processing being applied to the input image of FIG. 2A, and FIG. 2D is an image resulting from transformation processing being further applied to the image of FIG. 2C. As shown in FIG. 2C, by applying the smoothing processing to the input image of FIG. 2A, a peak of the first period is reduced. Furthermore, as illustrated in FIG. 2D, it is visibly recognizable that the moire due to the transformation processing being applied to the image of FIG. 2C is reduced. In other words, compared to FIG. 2B for which the smoothing processing is not performed, FIG. 2D has the same moire period corresponding to the second period, but the difference of the amplitude of the period shown graphically as the amplitude of the moire becomes smaller, and as a result, it is visibly recognizable that the moire is reduced. However, while the moire is reduced, the amplitude of the first period, corresponding to the original pattern of FIG. 2A before performing the transformation processing, is reduced as well. As a result, this is visibly recognizable as an adverse effect of a deterioration in clarity. To summarize the above described explanation, there is the effect that moire is reduced by the smoothing processing, but there is the adverse effect that the clarity of the input image is reduced.

Meanwhile, in Japanese Patent No. 3143209, in order to improve the above described adverse effect in Japanese Patent Laid-Open No. 1-134577, by applying weaker smoothing processing for edge regions than for non-edge region, edge regions becoming unclear is prevented. However, this method has a problem in that the moire reduction effect is weak. This is because when the smoothing processing on an edge region is weakened, the reduction effect on the moire is weakened, since the edge regions having high frequencies are the cause of the moire, as shown in FIGS. 2A-2D.

SUMMARY OF THE INVENTION

The present invention was conceived in view of the above described problems, and an aspect of the present invention is to maintain clarity while reducing image deterioration due to moire (interference fringes) in an image processing apparatus for performing image transformation processing.

According to one aspect of the present invention, there is provided an image processing apparatus, comprising: a discrimination unit configured to discriminate between a first region, which is a consecutive region existing on a region exceeding a predetermined area in an input image, and a second region, which is other than the first region; a spatial filter unit configured to perform smoothing processing of differing strengths on the first region and the second region discriminated by the scrimination unit; and an image transformation unit configured to perform image transformation processing on the image on which smoothing processing was performed by the spatial filter unit.

Further features of the present invention will become apparent from the following description of exemplary embodiments (with reference to the attached drawings).

DESCRIPTION OF THE EMBODIMENTS

[First Embodiment]

Figure 1:
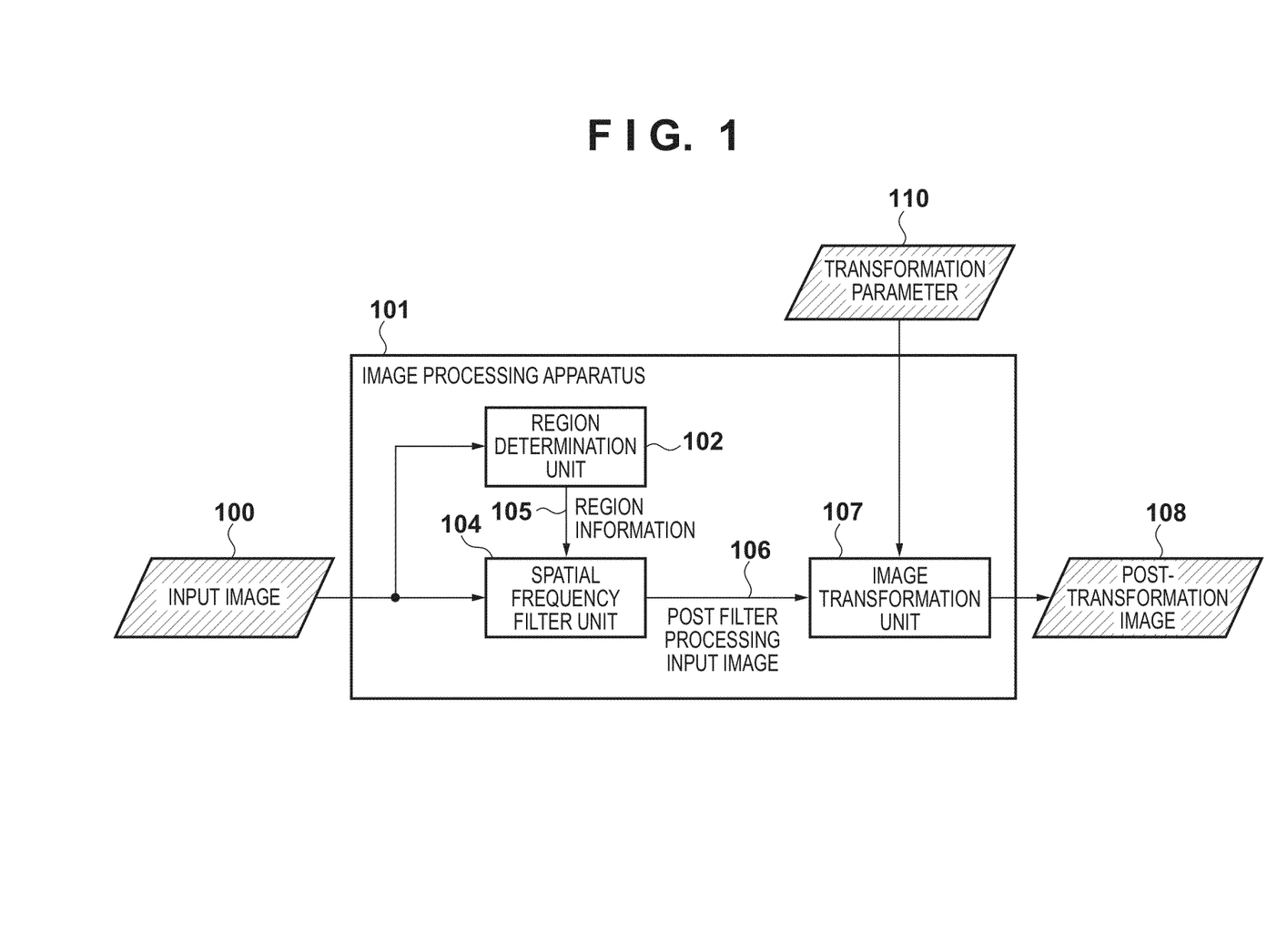
FIG. 1 is a view for showing a configuration of an image processing apparatus according to a first embodiment.

A configuration of an image processing apparatus according to the first embodiment is shown in FIG. 1. An image processing apparatus 101 takes as input an input image 100 and a transformation parameter 110, and outputs a post-transformation image 108. Here, the transformation parameter 110 is a parameter for indicating a correspondence relationship of coordinates of the input image 100 and the post-transformation image 108, and is represented by a 3×3 matrix in a general projection transformation. Detailed explanation will be given later. The image processing apparatus 101 comprises a region determination unit 102, a spatial frequency filter unit 104 and an image transformation unit 107. The region determination unit 102 takes as input the input image 100, and outputs region information 105 indicating characteristics of the image for each pixel of the input image 100. The region information 105 is information indicating whether or not same-colored pixels of a vicinity of each pixel of the input image 100 continue for a region greater than or equal to a constant value. Below, as this region information, a region for which same-colored pixels continue for a region of pixels greater than or equal to a constant value will be called "a macro region (first region)", and regions other than these will be called "a micro region (second region)".

The spatial frequency filter unit 104 takes as input the input image 100 and the region information 105, and outputs a post filter processing input image 106. Specifically, the spatial frequency filter unit 104 performs smoothing processing applying filter coefficients different for macro regions and micro regions indicated by the region information 105. In this embodiment, filter processing having a strong smoothing strength is applied to macro regions, and filter processing having a weak smoothing strength is applied to micro regions. Next, the image transformation unit 107 takes as input the transformation parameter 110 and a post filter processing input image 106, and outputs the post-transformation image 108. The post-transformation image 108 corresponds to something resulting from the shape of the post filter processing input image 106 being transformed based on the transformation parameter 110. The image processing apparatus 101 outputs the post-transformation image 108 generated in this way. Note, in FIG. 1, the transformation parameter 110 is input from outside, but configuration may be taken in which this is generated within the image processing apparatus 101. Below detailed explanation will be given for the processing of each of these.

Figure 3:
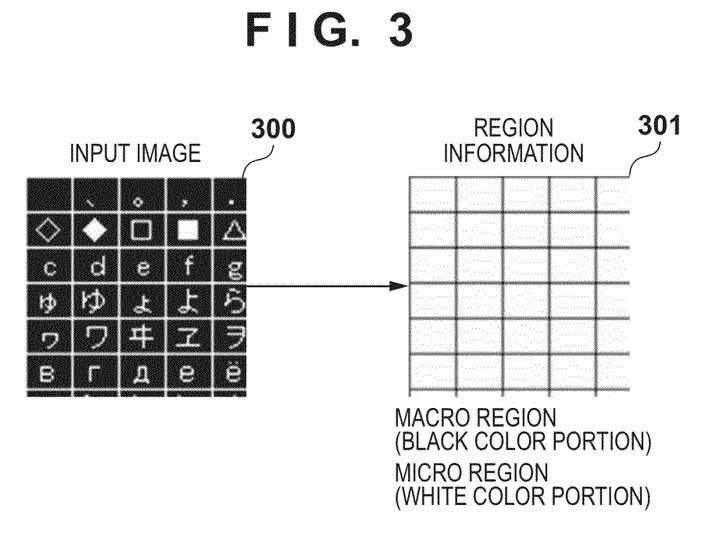
FIG. 3 is a view for showing an example of processing of a region determination unit 102.

Explanation will be given with reference to FIG. 3 for an example of processing of the region determination unit 102. In FIG. 3, explanation is given for a processing result, and processing details will be explained later in the explanation of FIG. 4 and FIG. 5. In FIG. 3, region information 301 generated for an input image 300 is shown. The input image 300 is an image in which ruled lines, characters and numerals are mixed. For the input image 300, by dividing the regions by whether or not same-colored pixels in the vicinity of each pixel are consecutive for a region of pixels greater than or equal to a constant value, macro regions (black colored portion) of the region information 301 and micro regions (white colored portion) are divided. In other words, the region determination unit 102 determines, as the region information 301, ruled line portions to be a macro region, and determines portions other than the ruled line portions to be micro regions.

Figure 4:
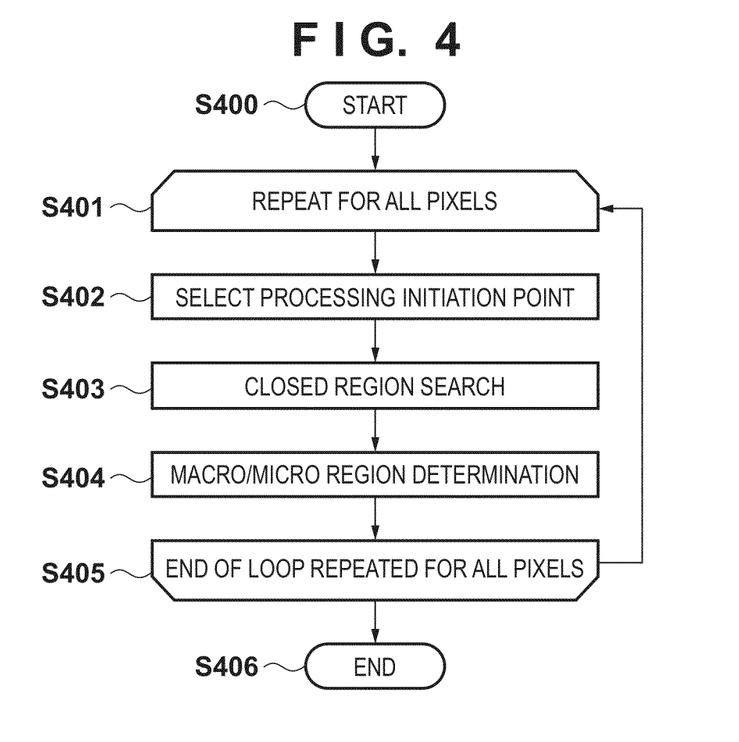
FIG. 4 is a view for illustrating a processing flow of the region determination unit 102.
Figure 5:
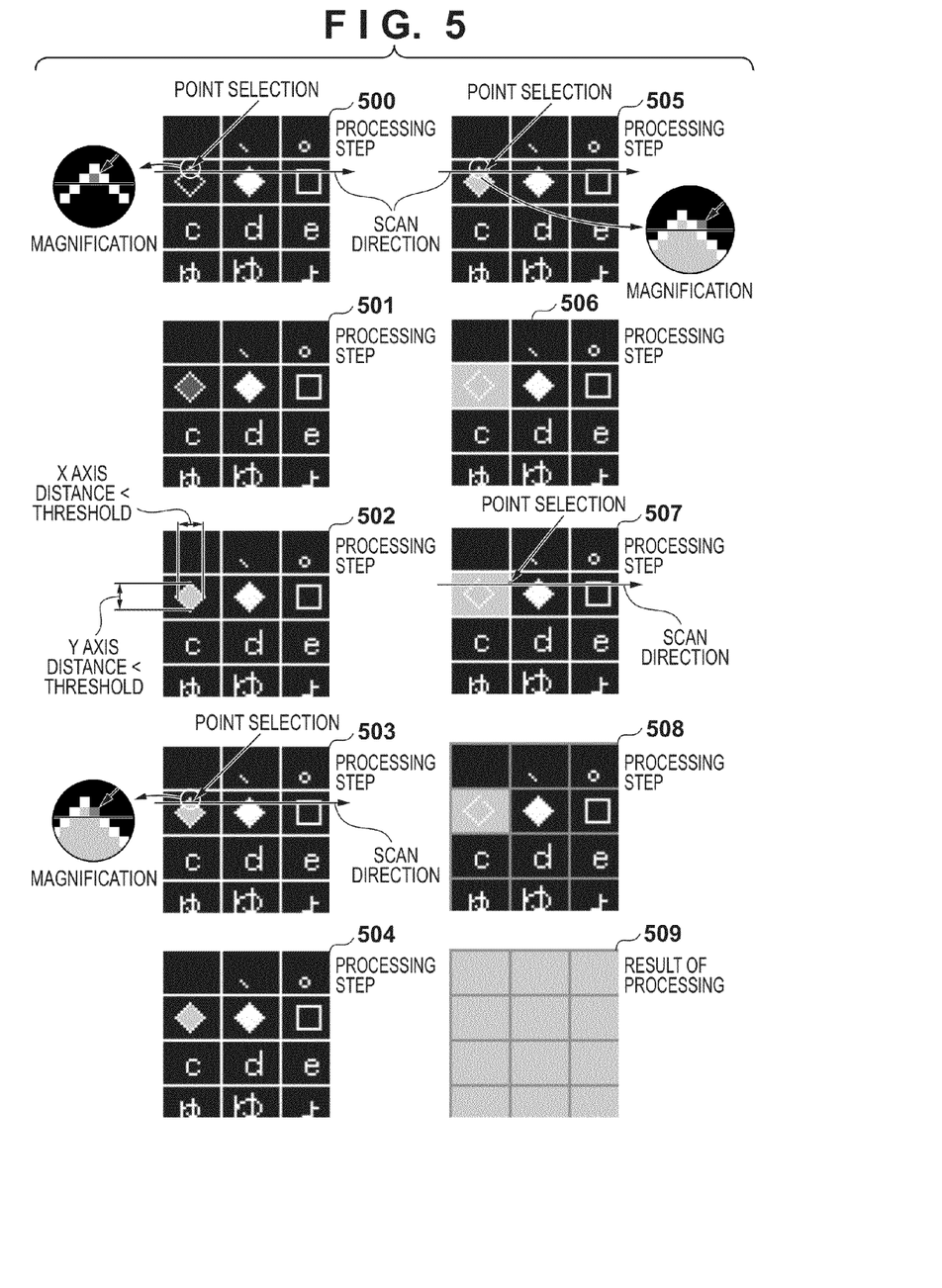
FIG. 5 is the view for showing an example of processing steps of the region determination unit 102.

Next, a processing flow of the region determination unit 102 will be shown with FIG. 4, and examples of processing steps will be shown with FIG. 5. Below, explanation will be given for the processing flow of FIG. 4, and the examples of processing steps of FIG. 5 together. In the processing flow of FIG. 4, the region determination unit 102 repeats the processing initiating from Start (S400), from a selection of a processing initiation point (step S402), up until a macro/micro region determination (step S404), for all of the pixels (from step S405 to step S401). After that, the region determination unit 102 transitions to End (step S406), and the processing completes.

Explanation will be given using FIG. 4 and FIG. 5 for examples of the processing steps performed by the region determination unit 102. Firstly, the region determination unit 102 initiates the processing from Start (S400), and enters the loop processing repeated for all of the pixels (step S401). Next, the region determination unit 102 performs a selection of a processing initiation point (step S402). The processing of step S402 corresponds to processing step 500 of FIG. 5. In processing step 500, the region determination unit 102 makes a line shown graphically to be a scan direction and selects one point indicated by an arrow. Note, in the example of FIG. 5, for simplicity of explanation, a pixel part way through the image is made to be the starting point. Next, the region determination unit 102 performs a search of a closed region (step S403). The processing of step S403 corresponds to processing step 501 of FIG. 5. In processing step 501, a region shown in a gray color, which is a change in color compared to the processing step 500, is a region discriminated by searching of the closed region. This processing is processing for discriminating same-colored pixel regions neighboring a selected pixel, and because generally paint routines, seed fill algorithms and the like are public knowledge, explanation is omitted.

Next, the region determination unit 102 performs a macro/micro region determination (step S404). The processing of step S404 corresponds to processing step 502 of FIG. 5. In the processing of step S404, a distance in an X-axis direction from a maximum value and a minimum value of X coordinates of the closed region obtained in processing step 501 are calculated, and comparison is performed with thresholds. Here, the thresholds are values that are larger than a vertical width or a horizontal width of a character or a numeral, and which are determined by predicting input images at design time. For example, in this embodiment, a minimum character size needed to maintain clarity is predicted to be 20×20 pixels, and so thresholds in the x-axis direction and the y-axis direction are set to be 20 pixels. Also, in a Y orientation, similarly, a distance in a y-axis direction is calculated from a maximum value and a minimum value of Y coordinates of the closed region (surface area), and comparison is performed of the distance with the predetermined thresholds. The region determination unit 102 determines that the closed region is a macro region in cases where either side, out of the comparison results in the x-axis direction and the y-axis direction, is determined to be exceeding the threshold. In processing step 502, it is shown that because for the closed region in which the single pixel selected in processing step 501 is included, the distances in the x-axis direction and the y-axis direction are less than or equal to the thresholds, the region is determined to be a micro region closed region.

Next, after step S404, the region determination unit 102 returns in the loop being repeated for all of the pixels (from step S405 to step S401) and performs selection of the processing initiation point once again (step S402). In the processing of step S402, as shown in corresponding processing step 503, the region determination unit 102 selects a pixel neighboring the selection point of processing step 500 in the scan direction. Then, the region determination unit 102 performs searching of the closed region (step S403), and macro/micro region determination (step S404). In processing step 504, which corresponds to this processing, it is shown that because for the closed region in which the single pixel selected in processing step 503 is included, the distances in the x-axis direction and in the y-axis direction are less than or equal to the thresholds, the region is determined to be a micro region closed region.

Next, the region determination unit 102 once again returns in the loop being repeated for all of the pixels (from step S405 to step S401) and performs selection of the processing initiation point (step S402), and the corresponding processing step 505 is obtained. Then, the region determination unit performs searching of the closed region (step S403) and the macro/micro region determination (step S404), and the corresponding processing step 506 is obtained. In processing step 506, it is shown that because for the closed region in which the single pixel selected in processing step 505 is included, the distances in the x-axis direction and the y-axis direction are less than or equal to the thresholds, the region is determined to be a micro region closed region. Also, in processing step 506, it is shown that a region shown in a gray color is a closed region in conjunction with the closed region determined in processing steps 502 and 504. In other words, it is shown that, in addition to the pixel selected in processing step 505, the pixels neighbouring in the scan direction shown in a gray color are those for which the macro/micro region determination (step S404) has already been completed.

Next, the region determination unit 102 once again returns in the loop being repeated for all of the pixels (from step S405 to step S401) and performs selection of the processing initiation point (step S402), and the corresponding processing step 507 is obtained. The pixels neighbouring in the scan direction to the pixel selected in processing step 505 are those for which the macro/micro region determination (step S404) has been completed already. Accordingly, the selection of the processing initiation point (step S402) is performed for a pixel for which the macro/micro region determination (step S404) has yet to be completed by skipping in the scan direction, and a pixel shown graphically in processing step 507 is selected. Next, searching of the closed region (step S403), and the macro/micro region determination (step S404) is performed, and the corresponding processing step 508 is obtained. The single pixel on the ruled line region that was selected in processing step 507 is different to the pixels selected thus far, and because the ruled line region is a consecutive region existing on a region that is wider than the threshold, the region determination unit 102 determines that this region is a macro region. Note, macro regions are shown in a dark gray color. So, the flow of FIG. 4 is repeated for all of the pixels and a result 509 of the processing is obtained when the processing transitions to End (step S406). In this state, all of the regions of the input image are divided into either macro/micro region.

Figure 6:
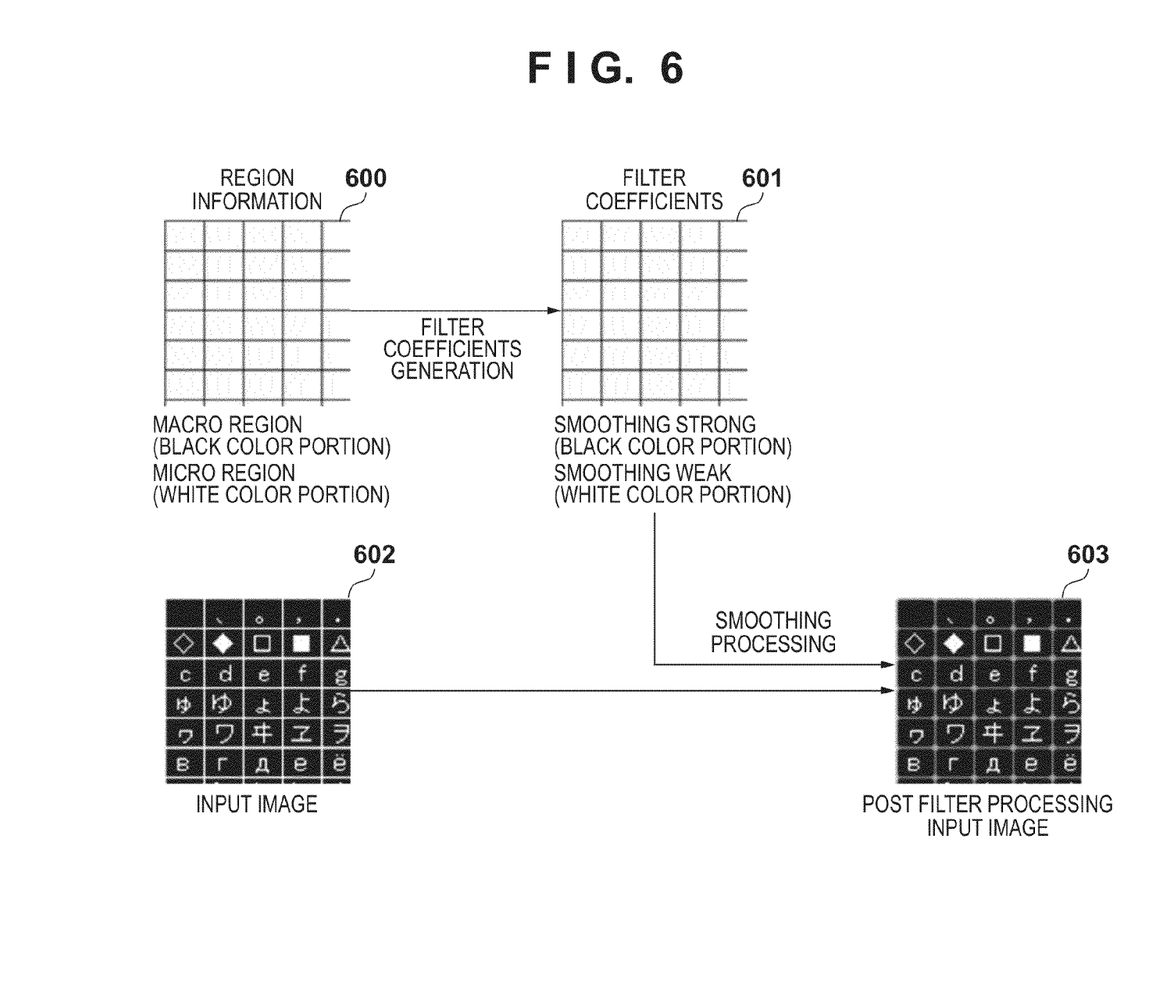
FIG. 6 is a view for showing an example of processing of a spatial frequency filter unit 104 according to the first embodiment.

Next, explanation will be given for an example of processing of the spatial frequency filter unit 104 using FIG. 6. In this processing, firstly filter coefficients 601 are generated from region information 600. As shown graphically, coefficients for strong smoothing strength are generated in the filter coefficients 601 for portions corresponding to macro regions of the region information 600, and coefficients for weak smoothing strength are generated for portions corresponding to micro regions. A post filter processing input image 603 is obtained by applying the filter coefficients 601 generated in this way to an input image 602, and performing smoothing processing. As shown in the post filter processing input image 603, strong smoothing processing is applied to portions of coefficients of the filter coefficients 601 for which the smoothing is strong, and weak smoothing processing is applied to portions of coefficients for which the smoothing is weak.

Figure 7:
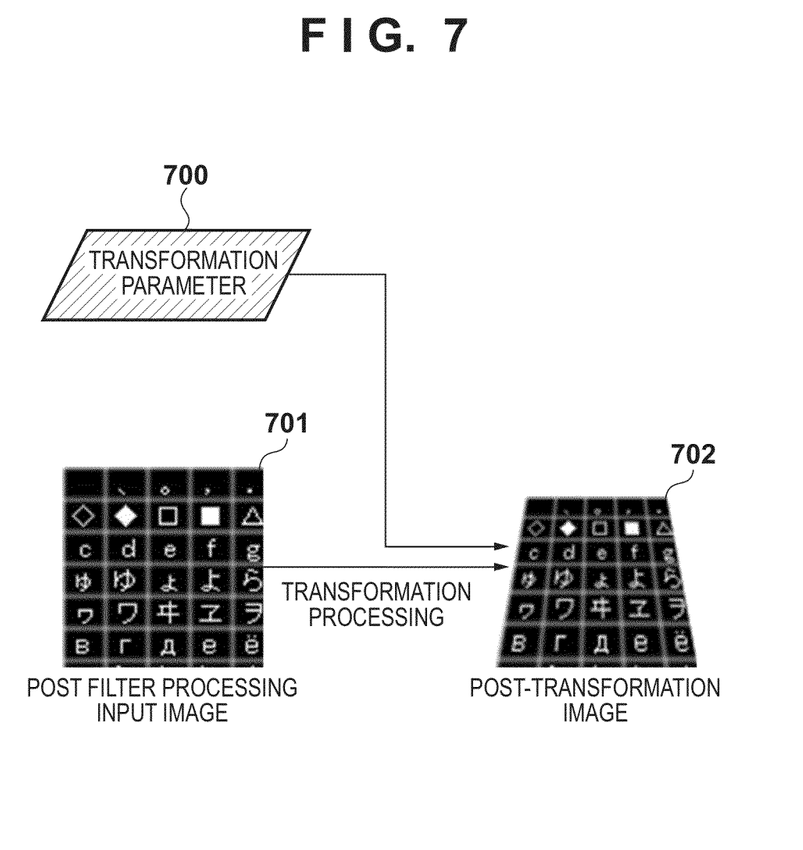
FIG. 7 is a view for showing an example of processing of an image transformation unit 107.

Next, explanation will be given for an example of processing of the image transformation unit 107 using FIG. 7. The image transformation unit 107 transforms an input post filter processing input image 701 based on a transformation parameter 700, and outputs the post-transformation image 108. The transformation parameter 700 is a parameter indicating a coordinate relationship for before and after the transformation, and the transformation parameter, and the coordinate relationship for before and after the transformation, are represented by the following equations in the case of a projection transformation. In other words when, $$\begin{pmatrix} x \\ y \end{pmatrix}: \text{coordinate before transformation}$$

$$\begin{pmatrix} x_{dst} \\ y_{dst} \end{pmatrix}: \text{coordinate after transformation}$$

$$M = \begin{pmatrix} m00 & m01 & m02 \\ m10 & m11 & m12 \\ m20 & m21 & m22 \end{pmatrix}: \text{transformation parameter}$$

then they are represented by $$\begin{pmatrix} x' \\ y' \\ z' \end{pmatrix} = M \cdot \begin{pmatrix} x \\ y \\ 1 \end{pmatrix}$$

-continued $$x_{dst} = \frac{x'}{y'}: x \text{ coordinate after transformation}$$

$$y_{dst} = \frac{y'}{z'}: y \text{ coordinate after transformation}$$

The image transformation unit 107 performs transformation processing by performing coordinate transformation based on these equations, and outputs the post-transformation image 108, and the processing of the image processing apparatus 101 according to this embodiment completes.

In this way, in the first embodiment, macro regions are determined from the input image 100, and after smoothing processing is applied strongly to the macro regions, transformation processing is performed, and the post-transformation image 108 is obtained. The macro regions of the input image 100 are the regions that are the cause of the moire upon the transformation processing, but because the smoothing processing is applied strongly, moire in the post-transformation image 702 is reduced. On the other hand, the micro regions of the input image 602 are regions less likely to be the cause of the moire upon the transformation processing, and so because the smoothing processing is applied weakly, there is the effect that clarity is maintained.

[Second Embodiment]

Figure 8:
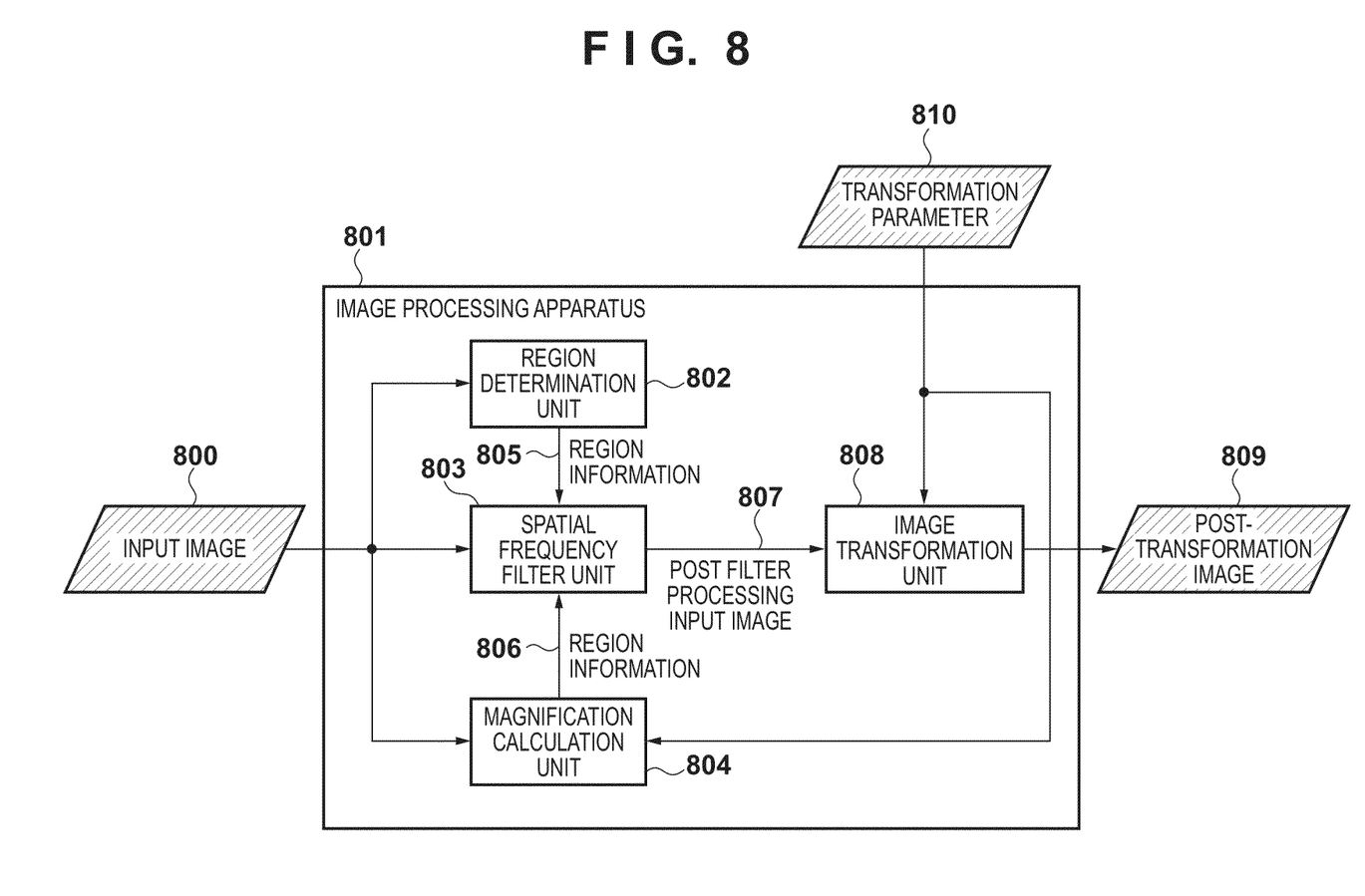
FIG. 8 is a view for showing a configuration of the image processing apparatus according to a second embodiment.

A configuration of an image processing apparatus according to the second embodiment is shown in FIG. 8. Compared to the first embodiment the processing details of a magnification calculation unit 804 and a spatial filter unit 803 are different. A region determination unit 802 and an image transformation unit 808 perform similar processing to the region determination unit 102 and the image transformation unit 107 of FIG. 1. Firstly, the magnification calculation unit 804 takes as input an input image 800 and a transformation parameter 810, calculates a post-transformation magnification for each pixel of the input image 800, and outputs the calculated magnification information 806 to the spatial filter unit 803. For example, in the case on transforming as in FIG. 7, a magnification of an upper part of the image is smaller compared to a lower part of the image. For the method of calculating the magnification information, a method is recited in Japanese Patent Laid-Open No. 2012-60517 in detail. Next, the spatial filter unit 803 takes as input the input magnification information 806 and outputs a post filter processing input image 807.

Figure 9:
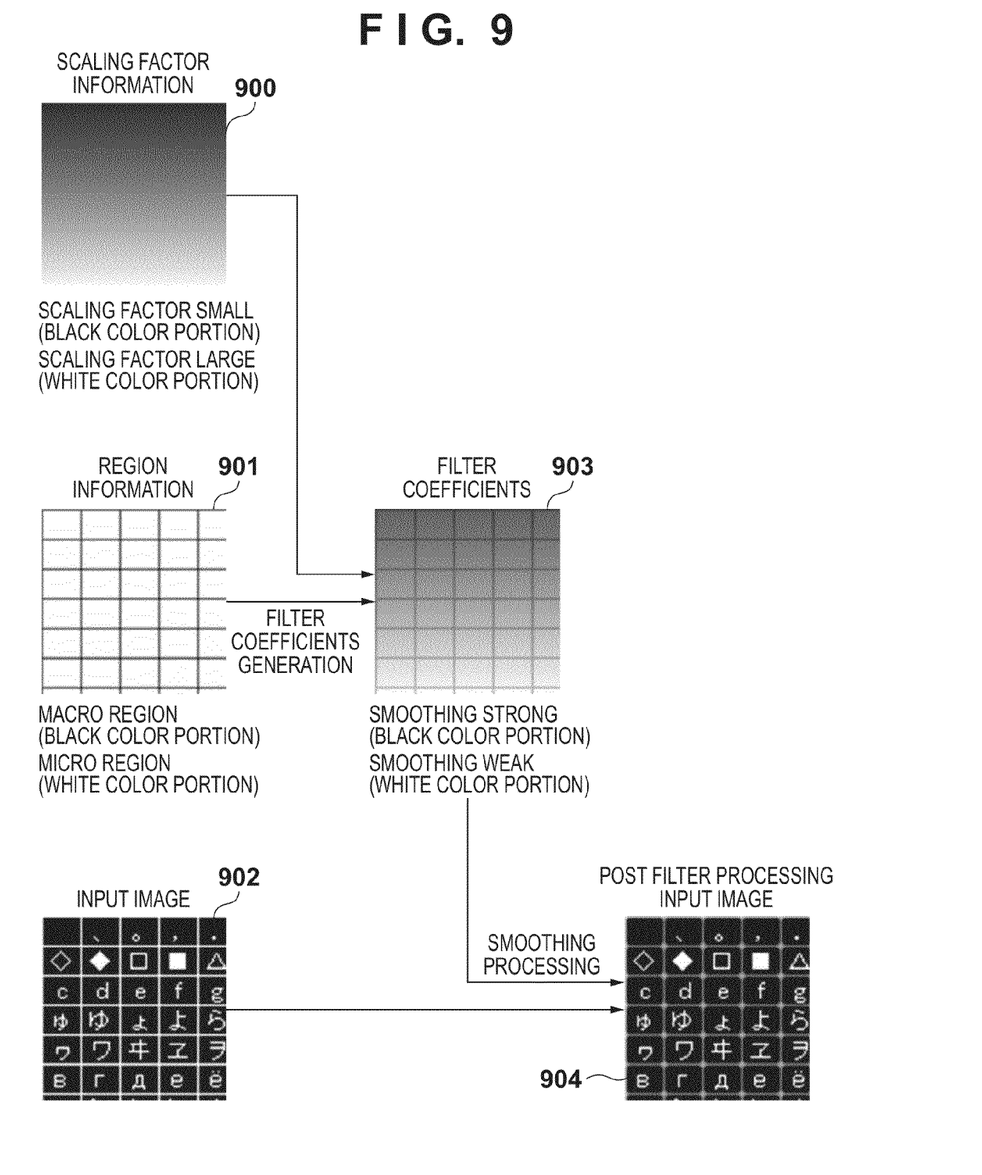
FIG. 9 is a view for showing an example of processing of a spatial filter unit 803 according to the second embodiment.

Explanation will be given in detail for the processing of the spatial filter unit 803 using FIG. 9. The spatial filter unit 803 generates filter coefficients 903 taking magnification information 900 and region information 901 as input. Regarding smoothing strength of the filter coefficients 903, for smaller magnification of the magnification information 900, smoothing strength for portions for which the region information 901 is a macro region is made to be stronger. Conversely, for larger magnification of the magnification information 900, smoothing strength for portions for which the region information 901 is a micro region is made to be weaker. A post filter processing input image 904 is obtained by applying the filter coefficients 903 calculated in this way to an input image 902, and performing smoothing processing. Other parts are the same as in the first embodiment, so explanation is omitted.

In this way, in the second embodiment, in addition to the processing achieved in the first embodiment, processing for applying a smoothing strength in accordance with the magnification information 900 is performed. Because the strength of the moire in regions for which the magnification is small becomes higher, there is the effect that by strengthening the smoothing processing of regions having a small magnification, moire can be reduced further.

In the above embodiments, as region information, regions for which same-colored pixels are consecutive for a region greater than or equal to a constant value are made to be macro regions, and regions other than these are made to be micro regions, but there need not be limitation to this. For example, regions straddling a wide region in the input image may be made to be macro regions, and regions other than these may be made to be micro regions. Also, in the above embodiments, configuration may be taken to divide into two or more regions, and accordingly set multiple smoothing strength coefficients. Also, in the above embodiment, explanation was given for an example of keystone (trapezoid) correction processing of a projector (image transformation processing), but there need not be limitation to image transformation processing. In other words, image transformation processing such as scaling processing such as enlargement or reduction, affine transformation processing such as rotation, barrel distortion correction processing, pincushion distortion correction processing, or the like can be raised as examples in which this may be used.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-098895, filed May 8, 2013 which is hereby incorporated by reference herein in its entirety.

What is claimed is:
1. An image processing apparatus, comprising:
a determination unit configured to determine whether or not a size of a region which is specified based on a comparison between pixel values of adjacent pixels in an input image is larger than a predetermined threshold;
a smoothing unit configured to perform smoothing processing on the input image according to a result of the determination by the determination unit such that a region having a larger size than the predetermined threshold is smoothed stronger than a region having a smaller size than the predetermined threshold; and an image transformation unit configured to perform image transformation processing on the image on which smoothing processing was performed by the smoothing unit.

2. The image processing apparatus according to claim 1, wherein the determination unit determines the size of the region based on the number of consecutive same-colored pixels in the input image.

3. The image processing apparatus according to claim 1, wherein the determination unit determines the size of a region surrounded by a pixel of a same color.

4. The image processing apparatus according to claim 1, wherein the determination unit determines that a size of the region is larger than the predetermined threshold in a case where a size in an X-axis direction or a Y-axis direction of the region is larger than the predetermined threshold.

5. The image processing apparatus according to claim 1, wherein the predetermined threshold is a value that is larger than a vertical width or a horizontal width of a character or a numeral contained in the input image.

6. The image processing apparatus according to claim 1, wherein the image transformation unit transforms based on a transformation parameter for an image smoothed by the smoothing unit.

7. The image processing apparatus according to claim 1, wherein the determination unit determines the region based on a seed fill algorithm.

8. The image processing apparatus according to claim 1, further comprising a magnification calculation unit configured to calculate magnification information for after transformation by the image transformation unit for each pixel of the input image,
wherein the smoothing unit performs smoothing processing of differing strengths on each region having a differing magnification based on the magnification information calculated by the magnification calculation unit.

9. The image processing apparatus according to claim 8, wherein a strength of smoothing for a region for which the magnification is larger is weaker than a strength of smoothing for a region for which a magnification is smaller.

10. The image processing apparatus according to claim 1, wherein the determination unit determines the adjacent pixels belong to one region in a case where each pixel value of the adjacent pixels is the same.

11. An image processing method, comprising:
determining whether or not a size of a region which is specified based on a comparison between pixel values of adjacent pixels in an input image is larger than a predetermined threshold;
performing smoothing processes, by using a filter unit, on the input image according to a result of the determination in the determining step such that a region having a larger size than the predetermined threshold is smoothed stronger than a region having a smaller size than the predetermined threshold; and
performing image transformation processing on an image on which smoothing processing was performed by the filter unit.

12. The image processing method according to claim 11, wherein the determining includes determining the size of the region based on the number of consecutive same-colored pixel in the input image.

13. The image processing method according to claim 11, wherein the determining includes determining the size of a region surrounded by a pixel of a same color.

14. The image processing method according to claim 11, wherein the determining includes determining that the adjacent pixels belong to one region, in a case where each pixel value of the adjacent pixels are the same.

15. A non-transitory computer-readable storage medium storing a computer program for controlling computer to execute an image processing method comprising:
determining whether or not a size of a region which is specified based on a comparison between pixel values of adjacent pixels in an input image is larger than a predetermined threshold;
performing smoothing processes on the input image according to a result of the determination in the determining step such that a region having a larger size than the predetermined threshold is smoothed stronger than a region having a smaller size than the predetermined threshold; and
performing image transformation processing on an image on which smoothing processing was performed.

* * * * *